United States Patent [19]

Wiesinger

[11] 4,403,712
[45] Sep. 13, 1983

[54] SNAP HINGE OF PLASTIC MATERIAL

[76] Inventor: Wilhelm Wiesinger, Koechlistrasse 2, CH-8004, Zurich, Switzerland

[21] Appl. No.: 341,208

[22] Filed: Jan. 21, 1982

[30] Foreign Application Priority Data

Jan. 21, 1981 [CH] Switzerland .......................... 360/81

[51] Int. Cl.³ ...................... B65D 43/14; B65D 51/04
[52] U.S. Cl. .................................. 220/339; 220/335; 16/225; 16/227; 16/DIG. 13
[58] Field of Search ................ 220/335, 339; 215/235, 215/237, 245; 222/517, 498; 16/225, 227, DIG. 13

[56] References Cited

U.S. PATENT DOCUMENTS

4,158,902  6/1979  Chernack et al. .................... 16/227
4,244,495  1/1981  Lorscheid et al. .................. 220/339
4,261,486  4/1981  Bush et al. ........................... 16/225

Primary Examiner—George T. Hall
Attorney, Agent, or Firm—Kane, Dalsimer, Kane, Sullivan and Kurucz

[57] ABSTRACT

An integral snap hinge of plastic material is intended to be used, e.g., for container closures or vacuum formed packages. At least two flexible joints extending in the direction of the main geometric axis are provided between these two hinge members. At least one of these flexible joints is constituted by a connecting element, which is flexibly linked to the hinge members by film hinges. The film hinges diverge so that the connecting element widens along the main geometric axis. The large or small ends of two connecting elements may face each other. The snap action is due to the fact that components of the snap hinge are resilient. The spring action may be performed by the connecting elements and/or by walls of the hinge members.

25 Claims, 22 Drawing Figures

SNAP HINGE OF PLASTIC MATERIAL

BACKGROUND OF THE INVENTION

This invention relates to an integral snap hinge of plastic material.

Snap hinges are disclosed in Swiss Patent Specification No. 516,725, in which two hinge members are interconnected by a film hinge provided within the main pivoting axis. The connecting elements represent a bendable spring, which during the snap action exerts forces on the two hinge members to forcibly move them from a position of unstable equilibrium alternatively to their open or closed positions. In accordance with FIGS. 8 to 15 of the Swiss patent specification the resilient connecting elements are linked to the hinge members by two additional film hinges. The axes of all three film hinges are parallel to each other.

A known field of application of snap hinges of that kind are container closures which are integrally injection molded with the hinges. The embodiments shown in FIGS. 10 to 15 of the Swiss patent specification cannot be used for that purpose because the resilient connecting element (62 to 76) extends around the main pivoting axis (60 or 75). The provision of such snap hinge on a closure would require complicated injection molds.

However, the embodiments shown in FIGS. 8 to 9 of the Swiss patent specification can be used for closures, and they must be formed with a relatively large cutout in at least one of the hinge members for accommodating the resilient connecting elements (see numeral 42). For this reason the resilient connecting element must be separated from one hinge member and partly also from the other hinge member by slots which extend transversely to the axes.

The strength of the snap hinge is impaired by the cutout, which must have a considerable length for accommodating the resilient connecting element. The snap hinge can relatively easily be destroyed if one hinge member is twisted relative to the other about an axis which is transverse to the principal or main axis.

In a snap hinge closure for bottles or the like, the body to be fitted on the mouth of the bottle is generally closed at its one end by a bottom, which contains a discharge opening. For the accommodation of the resilient connecting element, a relatively large cutout in the cover is required as well as a cutout in the body. Without the latter cutout, the film hinges which coincides with the main axis and provide a flexible connection between the two hinge members, would protrude outwardly to a relatively large extent. This would result in an unsatisfactory appearance and would prevent the screwing or snapping of the closure onto the bottle by means of a conventional closing machine so that special machines would be required.

If part of the cutout extends into the body, the cutout will protrude somewhat into the head plate and this will restrict the latitude for the closure designer. It is not possible to make closures which have discharge openings and associated parts that are large in relation to the overall diameter.

Finally, snap hinges according to the Swiss patent specification have a technical appearance so that they often fail to meet the esthetic requirements to be fulfilled by packages.

For the following reasons, the known snap hinges cannot be used as integrated hinges of vacuum formed packages. The cutout would impair the strength of the package. The punched out waste would give rise to considerable disturbances in production. In some uses the cutout would be disturbing because it constitutes a hole in the package.

SUMMARY OF THE INVENTION

It is an object of the present invention to provide a snap hinge which can be integrally made of plastic material and may constitute a part of a closure, a deep-drawn package or other plastic article. The snap hinge should be resistant to mechanical damage, also to torsion about an axis which is transverse to the principal axis. It should have an attractive appearance and should be usable in products in which no hinge parts protrude or protrude to a considerable extent so that the product can be processed further on a processing machine without need for special equipment. For instance, it should be possible to process closures without difficulty with standard closing machines.

The surface which is available for the actual function of the parts connected by the hinge should not be adversely affected by hinge parts or should be only slightly affected by them. For instance, the entire head surface of closures should be available for discharge openings.

The spring effect required for the snap action according to the invention may be achieved by making resilient one or more of the connecting elements or other elements of the snap hinge, e.g., in that one or both hinge members are resilient. It is essential that the film hinges which link connecting elements to the hinge members are not parallel but diverge so that the connecting elements cover a planar or spatial triangular surface. The required stability and symmetry are ensured in that at least one such connecting element and one additional flexible joint are provided at positions within the main geometric axis. The additional flexible joint may be in the simplest case a normal film hinge but is preferably a further connecting element which is linked to the hinge members by oblique film hinges. (Two connecting elements of this kind are also present if their large ends merge into each other so that the connecting elements together constitute a rhombus). A relatively long snap hinge, e.g., for use at an elongated box, may comprise more than two of such connecting elements, particularly a plurality of pairs of connecting elements.

It is not essential to provide a film hinge which directly interconnects the two hinge members, as is known in the art. The hinge action may also be performed by the oblique film hinges. But at least one shorter or longer film hinge may be provided, which coincides with the main geometric axis. In other cases the main geometric axis constitutes a pivoting axis but is not defined by a film hinge.

In a snap hinge according to the invention, a cutout in one or both hinge members is unnecessary. On the other hand, the diverging film hinges may be longer than the film hinges of previously known snap hinge closures. For both reasons, the resistance to unintended tensile and torsional stresses is increased. The omission of the cutout increases the latitude of the designer. The snap hinge has a satisfactory aesthetic appearance. The connecting elements can be so designed and arranged that when used in a closure they do not protrude outwardly or protrude outwardly only to a very small extent.

Snap hinges according to the invention can be so designed that the hinge members pass during their normal snap movement through a position of unstable equilibrium (dead center position). In that case the spring action on either side of the unstable position of equilibrium will cause the hinge to open or close. The hinge may alternatively be designed for such a position of unstable equilibrium that the hinge members spring only to an open or to a closing position.

The use of the hinge according to the invention is not restricted to packaging means. The hinge may be used within a large field of applications, for instance in electrical and electronic appliance, automobiles, furniture, etc.

The hinge may also be made as an independent component, which is subsequently assembled with a certain product. An example is a hinge for a furniture part.

Connecting elements shaped like flaring troughs are particularly suitable for bottle closures. The troughs may have different shapes in cross-section and in dependence on the type of the closure may face inwardly or outwardly when the closure is closed. If so desired, they can always be accommodated within the external contour of the closure.

The connecting elements may be tensile elements which need not be elastic in themselves if at least one of the hinge members is resilient near the main geometric axis. This arrangement can also provide the desired snap action.

The invention may be applied to snap hinges for vacuum formed packages. In order to prevent cracking of the deep-drawn material, such as polyvinylchloride or polystyrene, at the bends, each connecting element may have at least two deep-drawn troughs, each of which provides for part of the deflection which is required for a snap action.

If ribs extending transversely to the main axis are provided in the region in which the large ends of two connecting elements face each other, at least one bendable trough will be obtained in that region. As a result, the two connecting elements or each pair thereof can perform a snap movement transversely to the main geometric axis or such movement will be facilitated. As a result, the transverse ribs are sprung somewhat into the package when the package is closed or are sprung outwardly when the package has been opened.

BRIEF DESCRIPTION OF THE DRAWINGS

Illustrative embodiments of the invention will now be described with reference to the drawings in which:

FIGS. 19 and 22 show a fifth embodiment, namely, a vacuum formed package provided with a snap hinge with FIGS. 19 and 20 being perspective views showing the hinge in its closed and open positions, respectively, FIG. 22 being a top plan view showing the open package, and FIG. 21 being a transverse sectional view taken on line XXI—XXI of FIG. 22.

DETAILED DESCRIPTION

Figures 1, 1A, 2, 3, 4, 5:
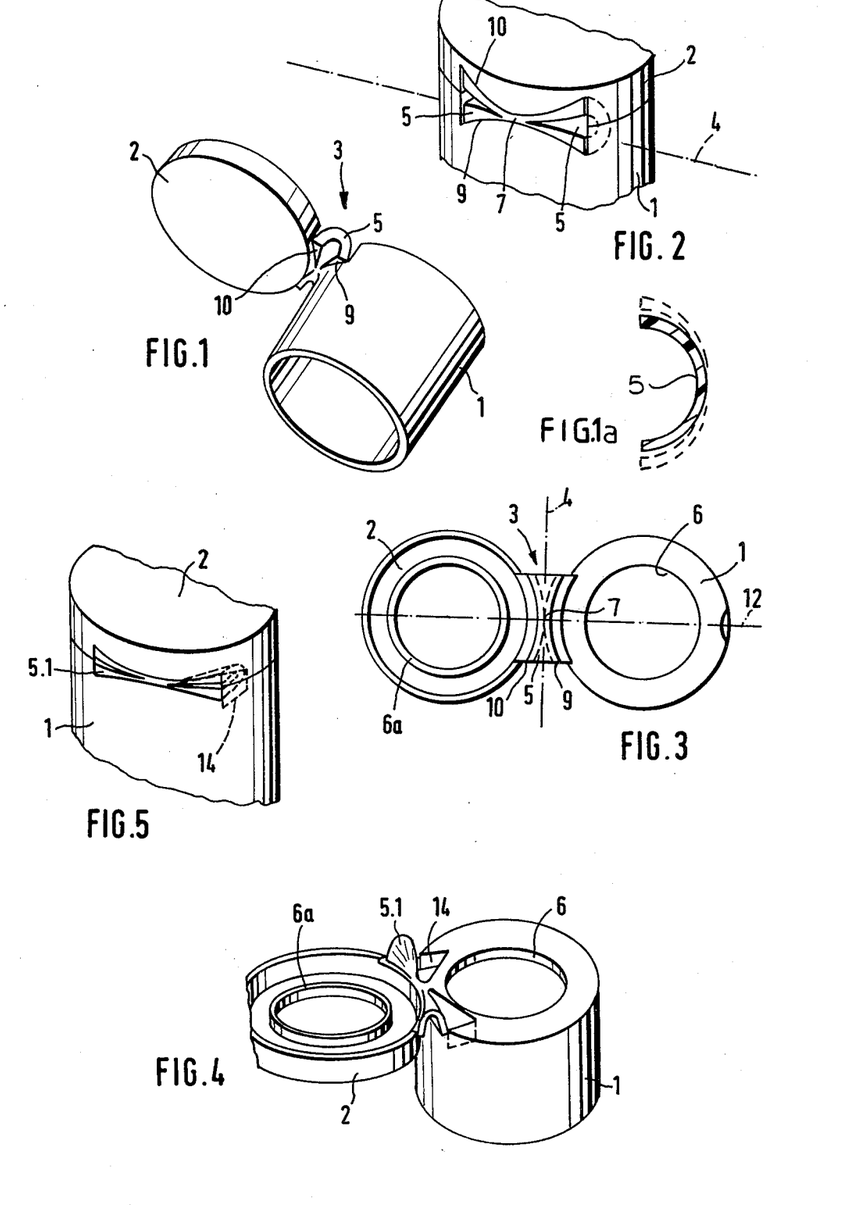
FIGS. 1 to 3 are perspective views and a top plan view showing an open closure comprising a first embodiment in which the connecting elements are troughs, which constitute bendable springs.
FIGS. 4 and 5 are perspective views showing a second embodiment of a snap hinge having similar bendable elements which do not move the hinge members beyond a neutral position but cause them only to snap open.

FIGS. 1 to 3 show a first embodiment snap hinge, which is generally designated 3 and has been integrally injection molded with a bottle closure, e.g. of polypropylene. The snap hinge comprises two hinge members 1 and 2. The hinge member 1 constitutes the body of a bottle closure and is adapted to be fitted on a bottle neck. The hinge member 2 constitutes a lid for sealing the body. The main geometric axis is designated 4. The body 1 has a wide discharge opening 6, and the hinge member 2 has a corresponding annular sealing lip 6a.

This hinge comprises two connecting elements 5, which are troughs being approximately U-shaped in cross-section. Both connecting elements taper in the direction of the main axis 4 to a point 7, which is situated within the main axis 4 and in a plane of symmetry 12 which is transverse thereto (FIG. 3).

The connecting elements 5 are linked by film hinges 9 and 10 to the two hinge members 1 and 2. Each film hinge 9, 10 extends continuously from the large lef-hand end of the left-hand connecting element 5 (FIG. 2) to the large right-hand end of the right-hand connecting element 5. Each film hinge describes a spatial curve, which lies entirely or almost entirely in the cylinder wall of the closure and when viewed from the side consists approximately of an arc of a circle.

A main hinge which directly interconnects the two hinge members is provided only near the point 7 and is of infinitely small length. It merges continually into the two film hinges 9, 10. Other embodiments require no main hinge at all. For this reason, reference is made in most cases to a "geometric" main axis, which means that a physical main hinge is not required.

In that case the connecting elements 5 are bendable springs with a U-shaped cross-section. When the hinge members are moved from the position of FIG. 1 to the position of FIG. 2, the connecting elements 5 are slightly bent open until the hinge members assume a neutral position of unstable equilibrium (see FIG. 1a). Thereafter the connecting elements tend to spring inwardly and to urge the hinge members to the closed position.

In this embodiment, when the closure is open, the resilient connecting elements 5 face upwardly (FIG. 1) whereas the resilient connecting elements protrude into the interior of the closure when the latter is closed (FIG. 2). There are no outwardly protruding parts and the closure has an attractive appearance. Owing to the length of the film hinges 9, 10, the structure is mechanically stable and cannot easily be damaged even when one hinge member is twisted relative to the other, particularly when the closure is open.

FIGS. 4 and 5 show a second embodiment of a closure having a snap hinge which can only snap open the cover. Whereas, in the first embodiment the connecting elements 5 are relaxed in both end positions, the connecting elements 5.1 of this embodiment are relaxed only in the open position shown in FIG. 4, whereas they are compressed as far as possible in the closed position, shown in FIG. 5. The cover is held in closed position by a suitable detent mechanism, e.g., the discharge opening 6 and the sealing lip 6a. When the detent mechanism has been opened, the cover snaps open automatically to a position which corresponds to an opening angle between 90 and 180 degrees, possibly partly a result of long-time deformation (cold flow). The hinge member 1 which constitutes the body has recesses 14, which serve to accommodate the compressed connecting elements 5.1.

Figures 6, 7:
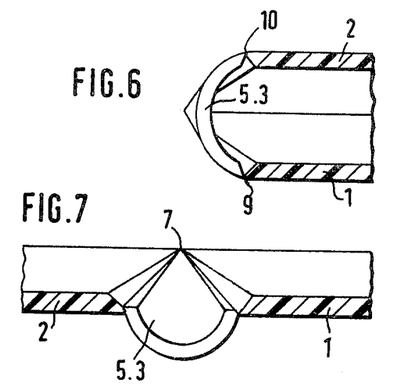
FIGS. 6 and 7 are axial sectional views showing a third embodiment of a snap hinge having connecting elements which are similar to those of the first embodiment but face outwardly rather than inwardly.

In the third embodiment shown in FIGS. 6 and 7, the connecting elements 5.3 consist again of bendable springs and do not bulge into the interior of an article as in FIG. 2, but bulge outwardly in the closed position and bulge downwardly when the hinge members are open (FIG. 7). In other respects the function is the same as described with reference to the first illustrative embodiment. There are again film hinges 9 and 10 and there is an infintely small real main axis at point 7.

Figure 8:
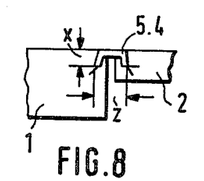
FIGS. 8 to 12 show modifications of the first to third embodiment.

As is shown, the resilient connecting elements may be U-shaped in a section that is transverse to the main geometric axis 4, but they may alternatively have different configurations, e.g., that of a triangle, rectangle or polygon. FIG. 8 shows an embodiment in which the connecting elements 5.4 are rectangular in cross-section. To provide the desired snap movement to the open and closed position and to ensure that when the hinge is closed the connecting elements 5.4 disappear as completely as possible in the two hinge members, the height x within each section transversely to the main axis is preferably smaller than the width z. To ensure a positive connection and an initial stress (or closing stress), the condition $2x \geq z$ should be fulfilled.

Figure 9:
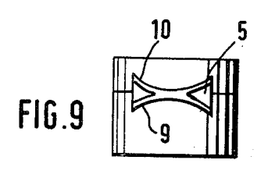
Figure 10:
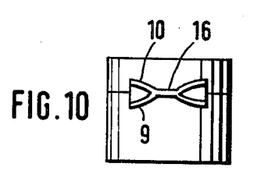
Figure 11:
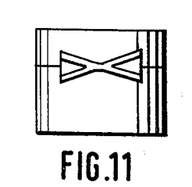
Figure 12:
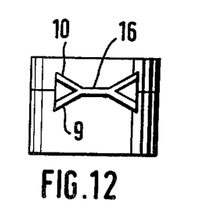

The film hinges 9 and 10, which limit the connecting elements, may be concave (FIG. 9), convex (FIG. 10) or straight (FIGS. 11 and 12). Numerous additional shapes may be adopted. In all illustrative emodiments described hereinbefore, the small ends of the connecting elements are facing each other and in accordance with FIGS. 1 to 7, 9 and 11 contact each other. In accordance with FIGS. 10 and 12, however, a straight portion of a main hinge 16 formed as a film hinge is provided between the small ends. The film hinges 9 and 10 are continued as the main hinge 16 and at the opposite ends branch again into the two film hinges 9 and 10. The film hinges 9 and 10 may be continued to extend along the main hinge 16 and are closely spaced apart in that region. This applies also to the embodiment shown in FIG. 9.

Figure 13:
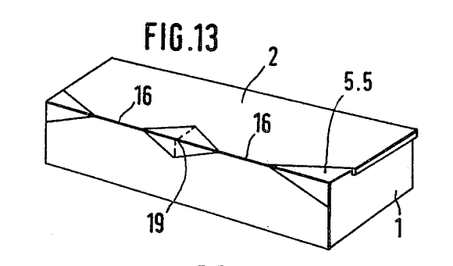
FIGS. 13 and 14 show the arrangement of two pairs of resilient connecting elements formed like V-shaped troughs and integrally formed with a box having a hinged cover.
Figure 14:
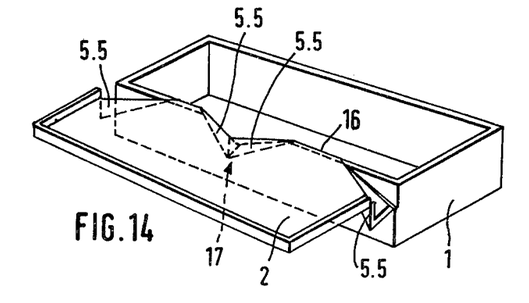

All embodiments described hereinbefore comprise one pair of connecting elements. FIGS. 13 and 14 show snap hinges connecting a box base, which constitutes the hinge member 1, to a snap cover, which constitutes the hinge member 2. Straight film hinges constitute portions of a main hinge 16. Resilient connecting elements 5.5 are provided at the outer ends of the hinge axis and are V-shaped in a section which is transverse to the geometric principal axis. The two outermost connecting elements constitute one pair of connecting elements and their large ends face outwardly. The connecting elements of an intermediate pair 17 have large ends disposed adjacent to each other. All connecting elements protrude outwardly when the box is open, i.e., they correspond to the embodiment of FIGS. 6 and 7, wherein when the hinge is closed they adapt themselves to the rectangular configuration of the box (FIG. 13).

The two connecting elements 5.5 of the pair 17 may be separated from each other by a slot 19 (FIG. 13), which extends transversely to the geometric main axis. The slot permits the two intermediate connecting elements, particularly when made of stiff material, to move apart as the box is opened.

The embodiment shown in FIGS. 13 and 14 can be modified so that either the two outer connecting elements or the two intermediate connecting elements are omitted.

The connecting elements need not be arranged in pairs. An odd number of connecting elements may be arranged along the geometrical main axis. The snap hinge may comprise only one connecting element if an additional flexible joint is provided in the main axis.

In special embodiments, openings may be provided along the geometric main axis, which are disposed between the small or wide ends of the connecting elements.

In the fourth embodiment shown in FIGS. 15 to 18, the connecting elements 5.6 are tensile elements, which are inelastic or only slightly elastic in tension. When the closure is open, the tensile elements are flat; when the closure is closed they lie smoothly along and contact the cylindrical wall of the closure, i.e., they then have the shape of sections of a cylindrical surface. In this case, the snap action is due to the fact that the wall of the hinge member 2, which constitutes a cover, is flexible in the region 18 near the point 7. During the snap movement beyond a position of unstable equilibrium, the wall can be forced inwardly by pressure in the region 18 or may be pulled radially outwardly in peripherally, more outwardly disposed regions, e.g., at 19. Alternatively, the region 7 between the two hinge members can be compressed or a plurality of these effects may be superposed. In all cases, there will be a springback after the hinge has moved through the position of unstable equilibrium.

In applications in which the hinge member 1 is not covered by a head plate 20, but is hollow there, the wall of the hinge member may also be used for the spring action.

Figures 15, 16:
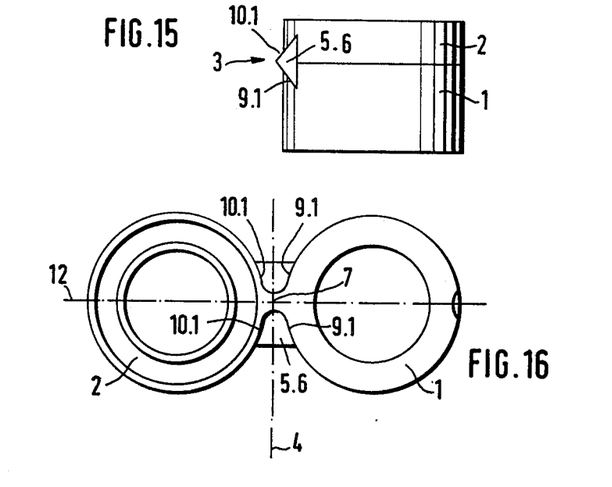
FIGS. 15 to 18 show a fourth embodiment, in which the connecting elements are flat tensile elements and the spring action is performed by the wall of one of the hinge members.
Figure 17:
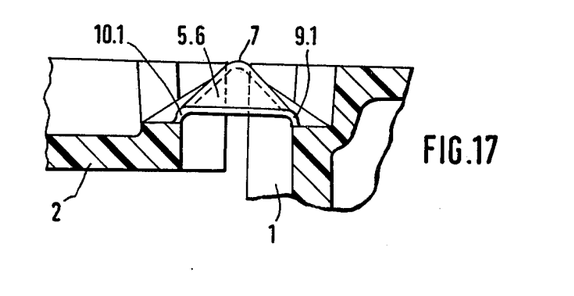
Figure 18:
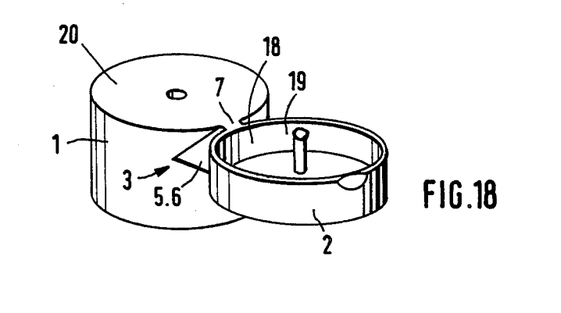

In accordance with FIG. 16, the film hinges 10.1 of the hinge member 2 do not merge, nor do the film hinge 9.1 of the hinge member 1, but the upper film hinge 9.1 in FIG. 16 merges arcuately into the film hinge 10.1. This applies also to the two lower film hinges.

A modified embodiment may comprise crossing film hinges, so that in FIG. 16 the upper film hinge 9.1 would merge along a straight line into the lower film hinge 10.1 and vice versa.

FIGS. 19 to 22 show a package formed from suitable sheet material, e.g. polyvinylchloride or polystyrene by a vacuum or pressed air forming or thermoforming process. The sheet material may be of considerable thickness, while film hinges must be thinner in most cases. In this fifth embodiment, the required film hinges are divided into a plurality of grooves which are parallel or extend at slight angles to each other. The package is formed in the position shown in FIGS. 20 and 22. There are again two hinge members 1 and 2, which in this case constitute the halves of the vacuum formed package. The large ends of the connecting elements 5.7 are adjacent to each other and merge one into the other continuously.

The function of the film hinges 9.3, 10.3 is fulfilled here by deep-drawn troughs, the walls of which consist of ribs 24 and 26. The ribs 25 merge into the walls 35 of the hinge members 1 and 2 and the ribs 26 into the connecting elements 5.7.

Each connecting element 5.7 has a rib 28 close to its large end, e.g., close to the center of the hinge. One pair of such ribs serves to transversely stiffen the connecting elements and to form a transverse connecting surface or bendable trough 30, which constitutes an axis about which the two connecting elements can be deflected. The troughs forming the film hinges 9.3 and 10.3 extend in V-shaped form toward each other as far as to the narrow ends 32 of the connecting elements.

Figures 19, 20, 21:
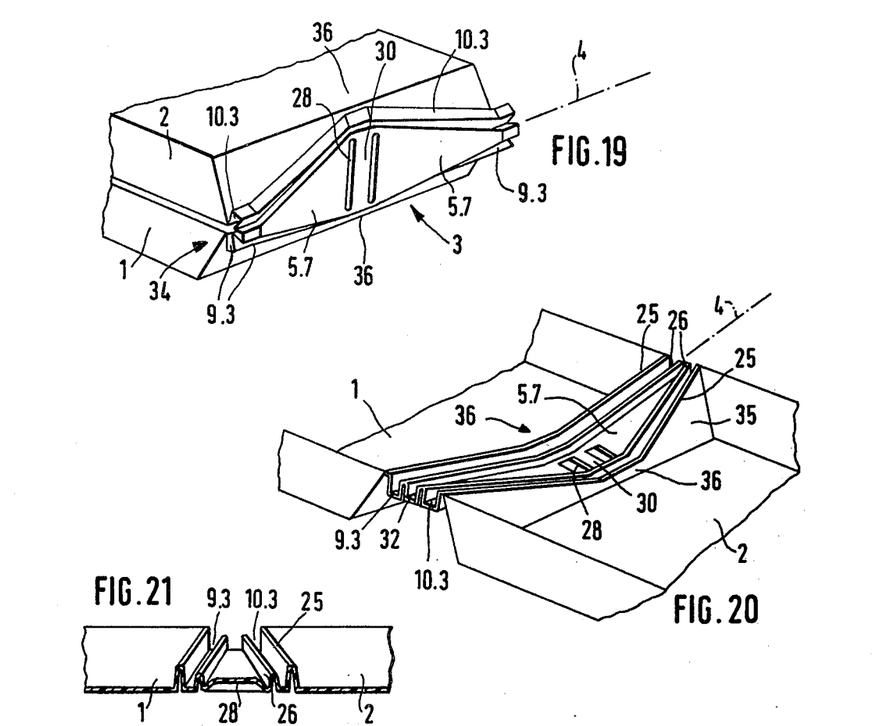

When a vacuum formed package is caused to spring from the position of FIG. 20 to the closed position shown in FIG. 19, the trough which constitute the film hinges 9.3 and 10.3 and the small ends 32, as well as the ribs 25 and 26 perform each part of the required flection. In this embodiment, these troughs when viewed in the direction of the arrow 34 have the configuration of a cloverleaf when the hinge is closed.

In this embodiment, the resilient snap action is due to the reverse folding of the connecting elements 5.7. Regions 36 of the container walls near the large ends of the connecting elements perform the spring action. In the open position shown in FIG. 20, the two connecting elements 5.7 together constitute a rooflike structure having a ridge which faces downwardly, to the outside of the package. During the movement to the closed position, the two connecting elements spring inwardly. There is again a rooflike structure, but its ridge faces inwardly. The connecting surface 30 constitutes a hinge. The hinge action of the connecting surface 30 facilitates the snap action of the rooflike structure.

At least the walls 35 of the hinge members are flexibly resilient to perform part of the spring action during the reverse folding operation.

Figure 22:
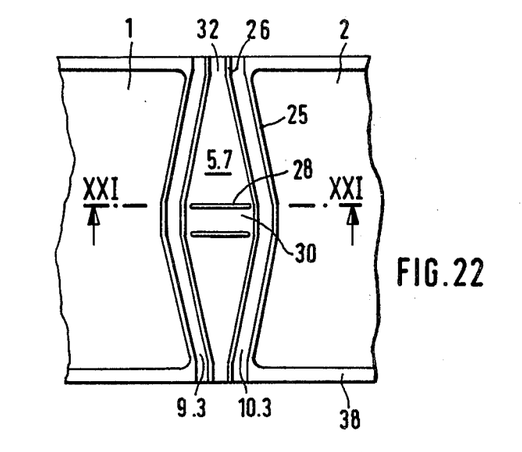

The hinge members 1 and 2 of the deep-drawn package may have a flange 38, which is shown only in FIG. 22.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. An integral snap hinge of plastic material, comprising:
    two hinge members adapted to be folded about a main geometric axis and being flexibly interconnected by at least one connecting element, the hinge members being flexibly interconnected at at least one additional place along the main geometric axis;
    film hinges having the connecting element interposed therebetween, the film hinges being divergent and at least one being inclined with respect to the main geometric axis: and
    at least one component of the snap hinge being resilient to perform the snap action.

2. A snap hinge according to claim 1, wherein the connecting element has a relatively small, particularly pointed end.

3. A snap hinge according to claim 1 wherein at least one pair of connecting elements is provided.

4. A snap hinge according to claim 3, wherein the connecting elements of a pair have large ends facing each other.

5. A snap hinge according to claim 4, wherein the large ends of the connecting elements are separated from each other by an aperture.

6. A snap hinge according to claim 4, wherein the large ends of the connecting elements are interconnected by at least one bendable trough.

7. A snap hinge according to claim 1, wherein the connecting elements are springs shaped like troughs, which diverge in the direction of the geometric main axis.

8. A snap hinge according to claim 7, wherein the troughs are arcuate in cross-section.

9. A snap hinge according to claim 7, wherein the troughs are V-shaped or polygonal in cross-section.

10. A snap hinge according to claim 7, wherein the snap hinge is provided on an article which is adapted to be closed and the trough-shaped connecting elements protrude into the interior of the article when the latter is closed.

11. A snap hinge according to claim 7, wherein the snap hinge is provided on an article which is adapted to be closed and the trough-shaped connecting elements face outwardly when the article is closed.

12. A snap hinge according to claim 1, wherein the connecting elements are tensile elements which have a small to infinitely small elasticity in tension, and at least one of the hinge members is flexibly resilient, near the main geometric axis.

13. A snap hinge according to claim 12, wherein the connecting elements are flat.

14. A snap hinge according to claim 1, wherein the snap hinge consists of vacuum formed, flexibly resilient sheet plastic material, each connecting element comprises at least two deep-drawn troughs, which constitute the film hinges.

15. A snap hinge according to claim 14, wherein the troughs are separated from each other and from the hinge members by ribs.

16. A snap hinge according to claim 15, wherein the troughs extend separately from each other to the small ends of the connecting elements.

17. A snap hinge according to claim 16, wherein the small ends of the connecting elements terminate in troughs.

18. A snap hinge according to claim 15, wherein the large ends of the connecting elements face each other and are provided with ribs, which extend transversely to the main geometric axis.

19. A container closure for sealing off the neck of a container, the closure comprising:
    a body for connecting with the neck of the closure and having a dispensing opening for the dispensing of the contents of the container;
    a lid for sealing off and permitting the opening of the dispensing opening in the body;
    connecting means for hingedly connecting the lid to the body so that the lid may be shifted about a main geometric axis between the sealing off position and the opening position at which the dispensing opening is, respectively, sealed off and opened, the connecting means including a film hinge disposed along the main geometric axis about which the lid pivots between the sealing off position and the opening position;

a pair of opposed connecting elements interposed between the lid and the body on opposite sides of the film hinge, each connecting element having a relatively small substantially pointed end facing the end of the opposed connecting element;

divergent film hinges having a connecting element interposed therebetween hingedly connecting each connecting element to the lid and the body, the film hinges being divergent and inclined with respect to the main geometric axis;

the connecting elements being spring-like troughs symmetrical with respect to the main geometric axis, the troughs being resilient to bias the lid relative to the body at a location between the sealing off position and the opening position and having a dead center biasing position at one side of which the lid is biased to the sealing off position and at the other side of which the lid is biased to the opening position.

20. A closure according to claim 19 wherein the troughs are disposed inwardly of the lid and body when in the sealing off position.

21. A closure according to claim 19 wherein the troughs are disposed outwardly of the lid and body when in the sealing off position.

22. A closure according to claim 19 wherein, in section, each trough as a height and a width, the height being smaller than the width.

23. A closure according to claim 19 wherein the body and lid have circular cross-section and the film hinges connecting the connecting elements to the lid and body being disposed in the circles of the lid and body both in the sealing off position and opening position.

24. A container closure for sealing off the neck of a container, the closure comprising:

a body for connecting with the neck of the closure and having a dispensing opening for the dispensing of the contents of the container;

a lid for sealing off and permitting the opening of the dispensing opening in the body;

connecting means for hingedly connecting the lid to the body so that the lid may be shifted about a main geometric axis between the sealing off position and the opening position at which the dispensing opening is, respectively, sealed off and opened, the connecting means including a hinge film disposed along the main geometric axis about which the lid pivots between the sealing off position and the opening position;

a pair of opposed connecting elements interposed between the lid and the body on opposite sides of the film hinge, each connecting element having a relatively small substantially pointed end facing the end of the opposed connecting element;

divergent film hinges having a connecting element interposed therebetween hingedly connecting each connecting element to the lid and the body, the film hinges being divergent and inclined with respect to the main geometric axis;

the connecting elements being spring-like troughs symmetrical with respect to the main geometric axis, the troughs being resilient to bias the lid retention relative to the body to the opening position, the troughs biasing the lid to the opening position when in the sealing off position; and retention means overcoming the bias of the troughs when the lid is in the sealing off position releasably retaining the lid in the sealing off position and for permitting the lid to be manually released to the opening position.

25. A receptacle comprising:

a body, a lid for closing and opening the body;

connecting means for hingedly connecting the lid to the body so that the lid may be shifted about a main geometric axis between the closing position and the opening position, the connecting means including a hinge film disposed along the main geometric axis about which the lid pivots between the closing position and the opening position;

a first pair of opposed connecting elements interposed between the lid and the body on opposite sides of the film hinge, each connecting element having a relatively small substantially pointed end facing the end of the opposed connecting element;

another pair of connecting elements interposed between the lid and the body and between the first pair and having relatively large ends facing each other divergent film hinges having a connecting element interposed therebetween hingedly connecting each connecting element to the lid and the body, such film hinges being divergent and inclined with respect to the main geometric axis;

the connecting elements being spring-like troughs symmetrical with respect to the main geometric axis, the troughs being resilient to bias the lid relative to the body at a location between the closing position and the opening position and having a dead center biasing position at one side of which the lid is biased to the closing position and at the other side of which the lid is biased to the opening position.

* * * * *

(12) REEXAMINATION CERTIFICATE (4661st)
United States Patent
Wiesinger (10) Number: US 4,403,712 C1
(45) Certificate Issued: Oct. 29, 2002

(54) SNAP HINGE OF PLASTIC MATERIAL (75) Inventor: Wilhelm Wiesinger, Zurich (CH)

(73) Assignee: Wipag Engelberg, Engelberg (CH)

Reexamination Request:
No. 90/005,735, May 22, 2000

Reexamination Certificate for:
Patent No.: 4,403,712
Issued: Sep. 13, 1983
Appl. No.: 06/341,208
Filed: Jan. 21, 1982

(30) Foreign Application Priority Data

Jan. 21, 1981 (CH) .............................................. 360/81

(51) Int. Cl.[7] .......................... B65D 43/14; B65D 51/04
(52) U.S. Cl. .......................... 220/839; 16/225; 16/227; 16/DIG. 13; 220/838
(58) Field of Search ............................... 215/235, 237, 215/247; 220/4.22, 4.23, 837–839, 847; 16/225, 227, DIG. 13; 222/498, 517

(56) References Cited

U.S. PATENT DOCUMENTS

| 1,928,445 A |   | 9/1933  | Boyd |
|---|---|---|---|
| 1,958,466 A | * | 5/1934  | Boyd ......................... 220/838 |
| 2,894,654 A | * | 7/1959  | Loher ......................... 215/235 |
| 3,034,354 A | * | 7/1962  | Fitzgerald .................. 220/4.23 |
| 3,135,456 A |   | 6/1964  | Palazzolo |
| 3,145,895 A | * | 8/1964  | Reifers ..................... 206/521.1 |
| 3,628,215 A |   | 12/1971 | Everburg |
| 3,629,901 A | * | 12/1971 | Wolf .......................... 220/883 |
| 3,933,271 A |   | 1/1976  | McGhie ....................... 220/335 |
| 4,386,714 A | * | 6/1983  | Roberto et al. ............. 220/834 |

OTHER PUBLICATIONS

Zeller, Plastic, Koehn, Grabner & Co., vs. Joyce Molding Corp., in the United States District Court For the District of New Jersey, Civil No. 88–133, Newark, New Jersey Oct. 11, 1988, Before: The Honorable Harold A. Ackerman, U.S.D.J.
Wiesinger, Wilhelm, *Patentierte Schnappscharniere aus Kunststoff*, 1972.

* cited by examiner

*Primary Examiner*—Lee Young (57) ABSTRACT

An integral snap hinge of plastic material is intended to be used, e.g., for container closures or vacuum formed packages. At least two flexible joints extending in the direction of the main geometric axis are provided between these two hinge members. At least one of these flexible joints is constituted by a connecting element, which is flexibly linked to the hinge members by film hinges. The film hinges diverge so that the connecting element widens along the main geometric axis. The large or small ends of two connecting elements may face each other. The snap action is due to the fact that components of the snap hinge are resilient. The spring action may be performed by the connecting elements and/or by walls of the hinge members.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 13, 16–18 and 19–25 is confirmed.

Claims 1, 3–12, 14 and 15 are cancelled.

\* \* \* \* \*